(12) United States Patent
Neubrand et al.

(10) Patent No.: US 8,266,241 B1
(45) Date of Patent: Sep. 11, 2012

(54) IMAGE SHARING (75) Inventors: Hans-Werner Neubrand, Cupertino, CA (US); Baskaran Subramanian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 813 days.

(21) Appl. No.: 10/873,822

(22) Filed: Jun. 22, 2004

(51) Int. Cl.
*G06F 15/16* (2006.01)
*G06F 3/00* (2006.01)
*G06F 13/00* (2006.01)
*G06F 9/44* (2006.01)
*G06F 9/46* (2006.01)

(52) U.S. Cl. .................................. 709/217; 719/321
(58) Field of Classification Search .......... 709/217–219; 719/321
See application file for complete search history.

(56) References Cited

U.S. PATENT DOCUMENTS

| | | | |
|---|---|---|---|
| 5,287,519 A * | 2/1994 | Dayan et al. ................... 726/16 |
| 5,440,403 A | 8/1995 | Hashimoto et al. | |
| 5,801,689 A * | 9/1998 | Huntsman ..................... 715/733 |
| 5,917,542 A * | 6/1999 | Moghadam et al. ..... 348/231.99 |
| 5,949,412 A * | 9/1999 | Huntsman ..................... 715/740 |
| 6,209,048 B1 * | 3/2001 | Wolff .............................. 710/62 |
| 6,327,613 B1 * | 12/2001 | Goshey et al. ................ 709/208 |
| 6,401,124 B1 * | 6/2002 | Yang et al. .................... 709/228 |
| 6,549,934 B1 * | 4/2003 | Peterson et al. .............. 709/203 |
| 6,556,241 B1 * | 4/2003 | Yoshimura et al. ...... 348/211.99 |
| 6,704,819 B1 * | 3/2004 | Chrysanthakopoulos .... 710/240 |
| 6,754,695 B2 * | 6/2004 | Kuroshima ................... 709/210 |
| 6,832,102 B2 | 12/2004 | I'Anson | |
| 7,047,344 B2 * | 5/2006 | Lou et al. ...................... 710/305 |
| 7,072,987 B2 * | 7/2006 | Jurisch et al. ................. 709/249 |
| 7,149,366 B1 * | 12/2006 | Sun ............................... 382/284 |
| 7,165,224 B2 | 1/2007 | Pyhalammi | |
| 7,188,160 B2 * | 3/2007 | Champagne et al. ......... 709/220 |
| 7,430,003 B2 | 9/2008 | Nichols et al. | |
| 7,457,880 B1 * | 11/2008 | Kim .............................. 709/229 |
| 7,508,419 B2 | 3/2009 | Toyama et al. | |
| 7,546,353 B2 * | 6/2009 | Hesselink et al. ............ 709/216 |
| 7,587,467 B2 * | 9/2009 | Hesselink et al. ............ 709/214 |
| 2002/0040397 A1 * | 4/2002 | Choi ............................. 709/226 |
| 2002/0046237 A1 | 4/2002 | Yokokura | |
| 2002/0054321 A1 | 5/2002 | Kikuchi | |
| 2003/0048487 A1 | 3/2003 | Johnston et al. | |
| 2003/0191848 A1 * | 10/2003 | Hesselink et al. ............ 709/229 |
| 2004/0070670 A1 * | 4/2004 | Foster ........................ 348/207.1 |
| 2004/0076346 A1 | 4/2004 | Russon | |
| 2004/0093389 A1 * | 5/2004 | Mohamed et al. ............ 709/212 |
| 2005/0030375 A1 * | 2/2005 | Zangrande et al. ........... 348/143 |
| 2005/0114711 A1 * | 5/2005 | Hesselink et al. ............ 713/201 |
| 2005/0120082 A1 * | 6/2005 | Hesselink et al. ............ 709/203 |
| 2005/0238205 A1 | 10/2005 | Kimura et al. | |
| 2005/0250548 A1 | 11/2005 | White | |
| 2006/0026600 A1 | 2/2006 | Yoshida | |
| 2006/0031489 A1 * | 2/2006 | Marcjan ........................ 709/225 |
| 2006/0090045 A1 * | 4/2006 | Bartlett et al. ................ 711/156 |
| 2006/0161639 A1 * | 7/2006 | Kato ............................. 709/219 |
| 2006/0187317 A1 | 8/2006 | Montulli et al. | |
| 2006/0206605 A1 | 9/2006 | Machida | |
| 2007/0073937 A1 | 3/2007 | Feinberg et al. | |
| 2007/0146819 A1 | 6/2007 | Kai | |
| 2008/0226196 A1 | 9/2008 | Kojima | |
| 2009/0115852 A1 | 5/2009 | Jung et al. | |

* cited by examiner

*Primary Examiner* — George C Neurauter
(74) *Attorney, Agent, or Firm* — Adeli & Tollen LLP (57) ABSTRACT

A method, apparatus, and system for performing image sharing. A first computer is coupled to an external device capable of acquiring data. A second computer is coupled to the first computer. A direct access to data acquired by the external device is provided to the second computer.

29 Claims, 7 Drawing Sheets

IMAGE SHARING

BACKGROUND OF THE INVENTION

1. Field of the Invention

This invention relates generally to sharing of an image, and, more particularly, to a method, apparatus and system for providing remote access of images.

2. Description of the Related Art

There have been various advancements in the area of image capture technology for capturing images and processing them in a computer system. Image capture includes capturing of images processed by cameras and scanners. Generally, images are downloaded onto a computer, such as a Macintosh® computer system, and a user may browse through the various images captured by the camera or the scanner. The state-of-the-art generally calls for downloading the data relating to the capturing of images from a scanner or a camera. This requires the user to have immediate access to the computer system coupled to the camera or scanner, which requires access to the computer system. Additionally, the state-of-the-art generally requires that the computer coupled to the camera or the scanner have sufficient available resources to perform the downloading of the images. Therefore, processing and sharing various images can be made difficult.

There have also been various advancements in communications between computer systems. Networks, such as the Internet, intranets, or other private or public networks, are ubiquitous. In fact, many computers are connected to one or more networks at the same time. For example, a business may have hundreds or even thousands of computers coupled to its own private network, which was, at least initially, used primarily for storage and exchange of computer files. At least some of these same business computers may also be coupled to the Internet. Further, with the development of wireless devices, ad hoc networks may also be formed with properly configured portable devices. Even telephonic devices, such as cellular phones, pagers and the like, may be coupled to one or more of these networks. Small businesses and homes are also often connected in similar arrangements.

All of this connectivity has naturally led to communications between various users over these networks. For example, electronic mail (e-mail), because of its usefulness, is now commonplace. Other communications and computer technologies offer the possibility of accessing the content of one computer from a remote, second computer. Therefore, the natural evolution of technological advances may be directed toward providing a second computer system with capability to access an image that may be processed by a first computer system. State-of-the-art technology relating to such sharing calls for downloading an image onto a first computer and then providing digital data communications to a second computer system for performing image sharing. Developers have implemented Internet-based cameras ("web cams") that may acquire various images to be downloaded onto a first computer and then made accessible by a second computer. However, these systems generally provide for relatively low-resolution images that are downloaded onto a computer and then accessed by other computers.

Additionally, the second computer, which may be a client computer wherein the computer that acquires the images may be a server computer, may call for the implementation of on-line applications or device drivers that would communicate with the server computer. Additionally, the server computer may also need special drivers for allowing such communications. However, all of these implementations call for downloading various images onto the server computer and then making those images available for other computers. The industry generally lacks a more efficient manner of performing image file sharing.

The present invention is directed to overcoming or at least reducing one or more of the problems set forth above.

SUMMARY OF THE INVENTION

In one aspect of the present invention, a method is provided for performing image sharing. A first computer is coupled to an external device capable of acquiring data. A second computer is coupled to the first computer. A direct access to data acquired by the external device is provided to the second computer.

In another aspect of the present invention, a method is provided for performing image sharing. A first computer is coupled to an external device capable of acquiring data. A second computer is coupled to the first computer. A direct access to data acquired by the external device is provided to the second computer. A control of an operation of the external device is provided to the second computer through the first computer.

In another aspect of the present invention, a system is provided for performing image sharing. The system includes an external device that is capable of acquiring data. The system also includes a first computer coupled to the external device. The system also includes a second computer coupled to the first computer. The second computer is capable of directly accessing data acquired by the external device.

In still yet another aspect of the present invention, a computer readable program storage device encoded with instructions is provided for performing image sharing. The computer readable program storage device encoded with instructions that, when executed by a computer, performs a method, which includes coupling a first computer to an external device capable of acquiring data, coupling a second computer to the first computer, and providing a direct access to data acquired by the external device to the second computer.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention call for providing an image content sharing protocol for sharing images across a plurality of computer systems. Embodiments of the present invention provide for electronically coupling an image accessing device, which may be a scanner or a camera, and interfacing it with a first computer. The first computer may in turn be linked to a second computer via a remote network protocol, such as an Internet, intranet, a local-area network (LAN), a wide-area network (WAN), or any other type of computer communications protocol. The operation or the accessing of images provided by the image accessing device, such as a camera or scanner, may be directly performed by the second computer through the first computer. This may be performed without actually downloading the image captured by the image accessing device into the first computer. In other words, an image accessing device that is coupled to a first computer may be directly controlled by a second computer.

Additionally, embodiments of the present invention may provide for a special client application on a first computer system that is coupled to an image accessing device, wherein a second computer system may control or receive data from the image accessing device via a computer network, such as an Internet web network. Therefore, embodiments of the present invention may provide the ability to a remote computer to access images while the images are still on the image accessing device. Embodiments of the present invention may also provide for controlling the operation of the image accessing device via a local computer that is coupled to the image sensing device. Embodiments of the present invention may be performed to access and process high-resolution still and/or moving images.

Figure 1:
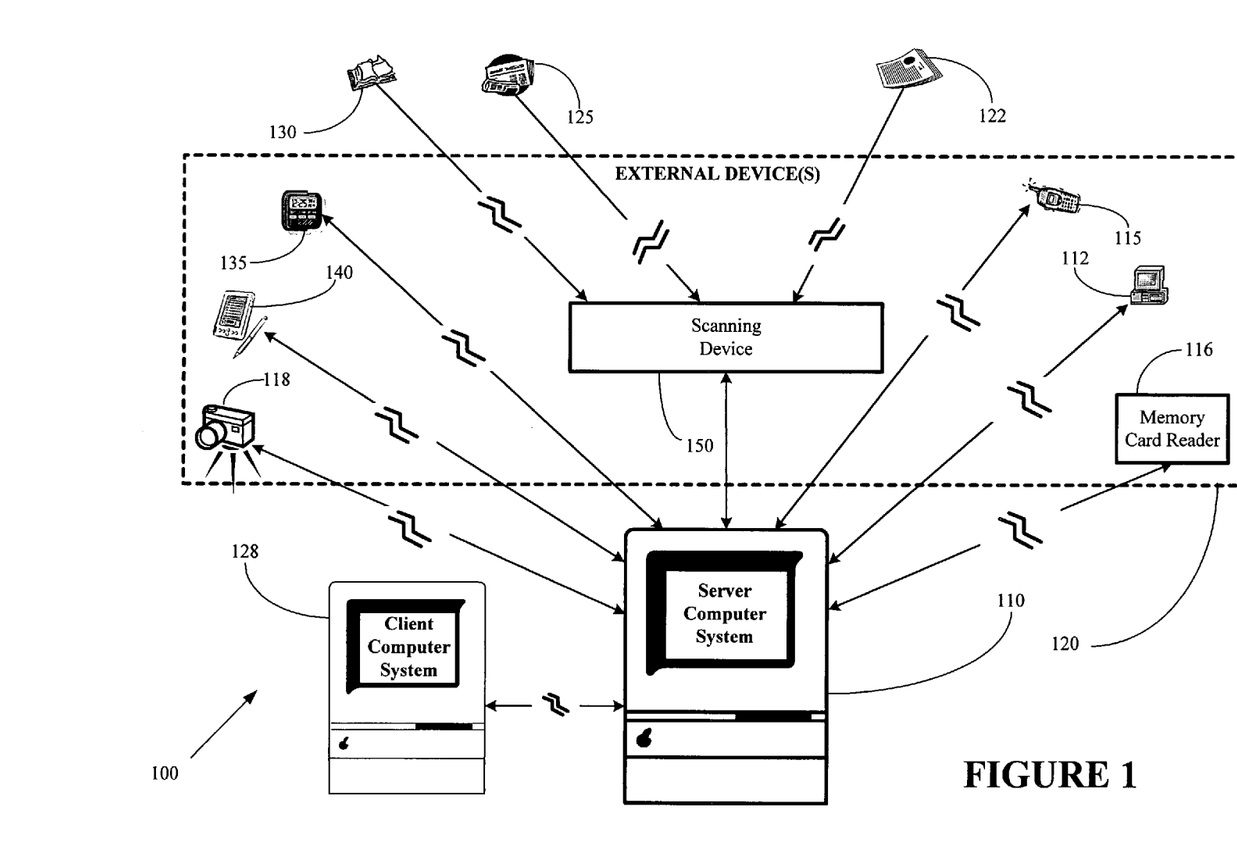
FIG. 1 illustrates a system comprising a server computer system and external devices, in accordance with one embodiment of the present invention.

Turning now to FIG. 1, a system 100 that depicts a server computer system 110 that is coupled to a plurality of external devices that may provide images to the server computer system 110 is illustrated. The system 100 in FIG. 1 illustrates a server computer system 110 that may receive data, such as image data from an external source 120. The external source 120 may be inclusive of one or more sources of image data. The external source(s) 120 may include a scanning device 150, a cellular or wireless phone 115, a personal communication device (e.g., pager, text messenger, such as one offered by Blackberry®) 135, a personal data assistant (PDA) 140, a memory card reader 116, a camera 118, and/or other sources of data. A client computer system 128 may be communicatively coupled with the server computer system 110. Utilizing embodiments of the present invention, the client computer system 128 is capable of directly accessing data from any one of the external devices 120 via the server computer system 110, without having to download data into the server computer system 110. Additionally, the client computer system 128 is capable of controlling the operations of the external devices 120 through the server computer system 110.

The term image data may include a variety of data including, but not limited to, images and text. In one embodiment, the server computer system 110 and the client computer system 128 may be an Apple Macintosh® 204. In an alternative embodiment, the server computer system 110 and/or the client computer system 128 may be an a classic Apple Mac® 206, a Power Mac G4®, a Power Mac G5®, an iMac®, an IBM compatible personal computer (PC) 208, and the like (shown in FIG. 2).

Figure 2:
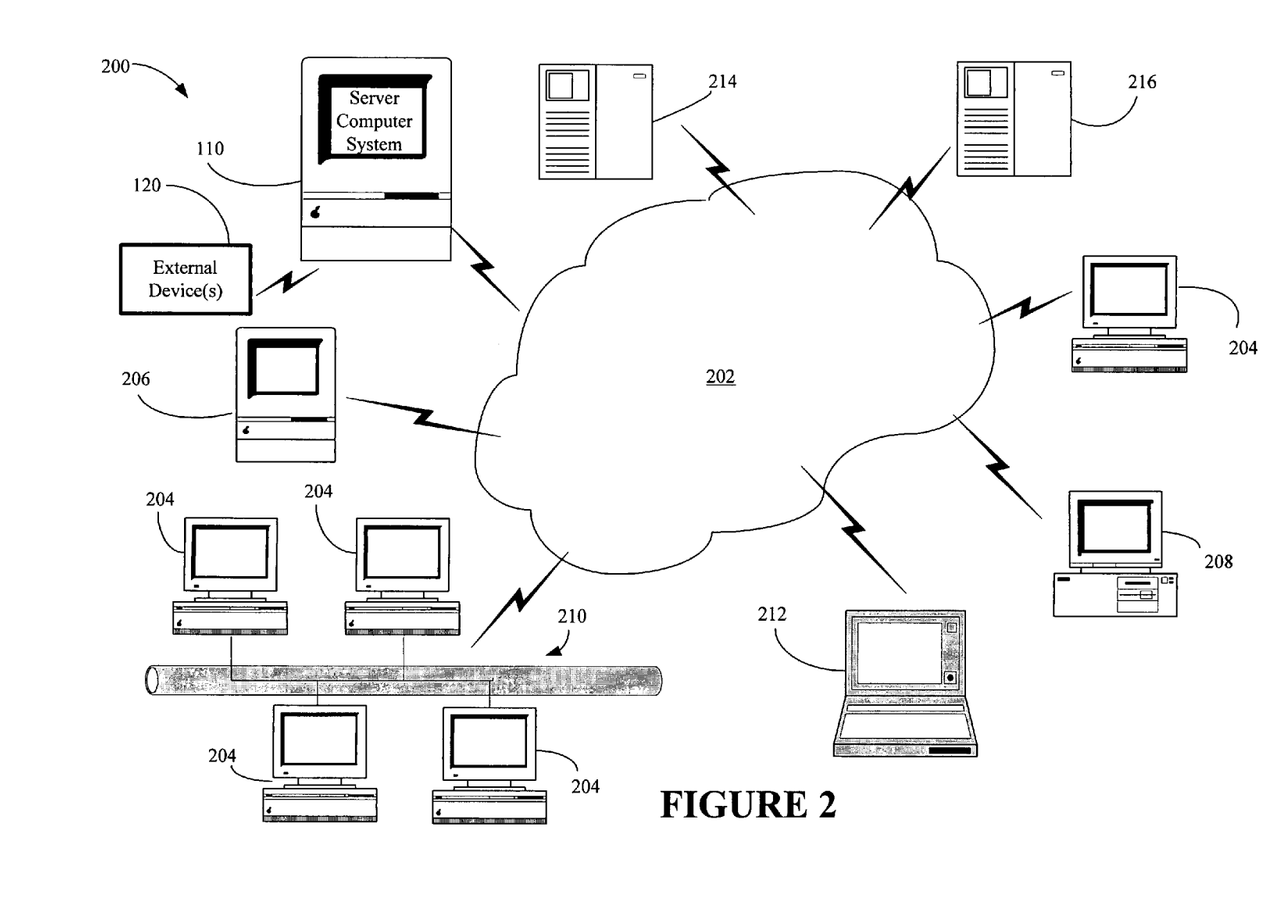
FIG. 2 illustrates a system for providing remote communications with the server computer system and the external devices of FIG. 1, in accordance with one embodiment of the present invention.

The server computer system 110 may receive image data from a scanning device 150, which may scan various image sources to provide the image data. The scanning device 150 may receive data, such as text data, from one or more sources. For example, the scanning device 150 may receive data from a simple text document 122, a newspaper 125, a book 130, and/or other sources that may be scanned by the scanning device 150. The server computer system 110 may also receive image data from a remote computer system 112, a cellular or wireless phone 115, a personal communication device (e.g., pager, text messenger, such as one offered by Blackberry®) 135, a personal data assistant (PDA) 140, a memory card reader 116, a camera 118, and/or the like. The server computer system 110 may provide the images to various other computers that may be electronically coupled to the server computer system 110 (as illustrated in FIG. 2). Additionally, various remote computers may control the operation of one or more of the external devices 120 via the server computer system 110.

Turning now to FIG. 2, a system 200 is depicted that illustrates remote computer systems accessing data or controlling the operation of the external devices 120 via the server computer system 110. The system 200 includes a plurality of computing devices coupled together through one or more network connections that allows for electronic communications with the server computer system 110. For example, a plurality of devices may be coupled together via a private or public network, such as a local area network (LAN) or the Internet 202. In an alternative embodiment, the plurality of devices may be coupled together via an intranet system. The actual connection between the devices and the Internet 202 may take on one or more of any of a variety of forms, such as a network interface card (NIC), a modem, a digital subscriber line (DSL), a cable modem, a wireless connection, and the like. The 5 devices coupled to the Internet 202 may include, for example, desktop computers or servers, such as an Apple Macintosh® 204, a classic Apple Mac® 206, a Power Mac G4®, a Power Mac G5®, an iMac®, an IBM compatible personal computer (PC) 208, and the dike. Further, these desktop computers, such as the Apple Macintosh® 204, may be coupled together via a smaller sub-LAN 210, with the sub-LAN 210 being coupled to the Internet 202. Portable devices, such as the Apple PowerBook® or iBook® 212, may also be coupled to the Internet 202, either directly or as part of the sub-LAN 210. Further, other consumer devices, such as cell phones, personal data assistants (PDAs), network appliances, and other embedded device, may be connected to the Internet 202 to employ aspects of the present invention.

While the invention has been illustrated herein as being useful in a network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that network connections may include a variety of other equipment, such as routers, switches, telephone modems, wireless devices, cable modems, digital subscriber lines, and the like. This type of equipment is not illustrated or discussed in detail herein so as to avoid unnecessarily obfuscating the present invention. For purposes of understanding the present invention, it is sufficient to recognize that additional conventional equipment of this type may be useful in establishing and maintaining communications between the various users. Using the exemplary system 200 illustrated in FIG. 2, a remote computer (e.g., 204, 206, 208, 212, 214, 216) may access the images from one or more of the plurality of external devices 120 and/or control an operation of one or more of the external devices 120 via the server computer system 110.

Figure 3:
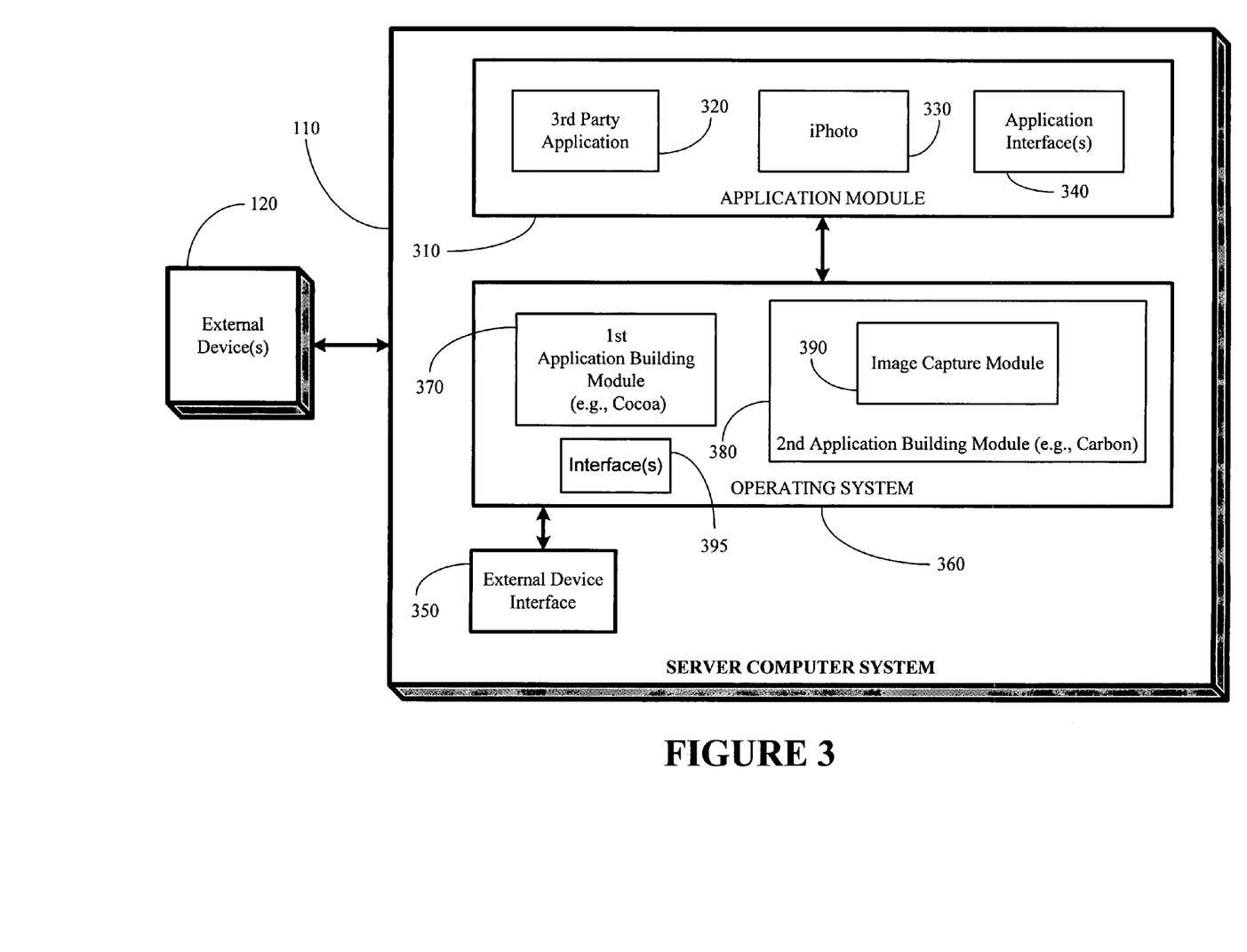
FIG. 3 illustrates a block diagram depiction of the server computer system of FIG. 1, in accordance with one embodiment of the present invention.

Turning now to FIG. 3, a more detailed block diagram depiction of the server computer system 110 is illustrated. In one embodiment, the server computer system 110 may comprise an application module 310, an operating system 360, and an external device interface 350. The application module 310 may comprise various software modules, such as a third party application 320, an iPhoto software package 330, and an application interface 340. The application interface 340 allows for data-exchange including content data, status data, and command data, between the operating system 360 and the application module 310. The third party application 320 may comprise various image data manipulation software packages.

The external device interface 350 is capable of receiving and sending data to and from the server computer system 110 and the external devices 120. The external device interface 350 is capable of forwarding the data to the various modules associated with the operating system 360. The operating system 360 comprises various interfaces 395 that are capable of respectively interfacing with the various applications in the application module 310. The operating system 360 may also comprise a first and second application building module 370, 380, which may include exemplary modules, such as the COCOA® and the Carbon® modules offered by Apple Computer, Inc. These application building modules 370, 380 may be used to develop an image capture module 390. The image capture module 390 is capable of processing image data relating to external devices 120. The image capture module 390 is also capable of providing access to an image acquired by the external device 120 to a remote computer communicatively coupled to the server computer system 110. A second or remote computer system (e.g., 204, 206, 208, 212, etc.) may access the operation of the external devices 120 or the data from the external device(s) 120 via the image capture module 390 in the server computer system 110. In other words, a remote computer may directly access the operation and the data relating to external devices 120 via the server computer system 110 without having to download data from the external devices 120 into the server computer system 110. In one embodiment, various aspects of the third party application 320 and/or the iPhoto 330 application may be utilized via the application module 310 to communicate with the external devices 120 through the image capture module 390. The operation of the iPhoto 330 may perform its operations without regard to whether the images that are processing are received locally or from a remote location via the remote computer system.

Utilizing embodiments of the present invention, the various applications in the application module 310 need not interface with the various protocols related to the external devices since a standard set of APIs of the applications of the application module 310 can be interfaced with the external devices 120 via the image capture module 390. Therefore, various types of external devices 120 with various interface protocols may readily communicate with either the server computer system 110 or any other computer system that may be in data communications with the server computer system 110.

Various blocks of the server computer system 110, as illustrated in FIG. 3, may be software, hardware, or firmware unit(s) that are standalone units or may be integrated into a computer system associated with the system 200.

Figure 4:
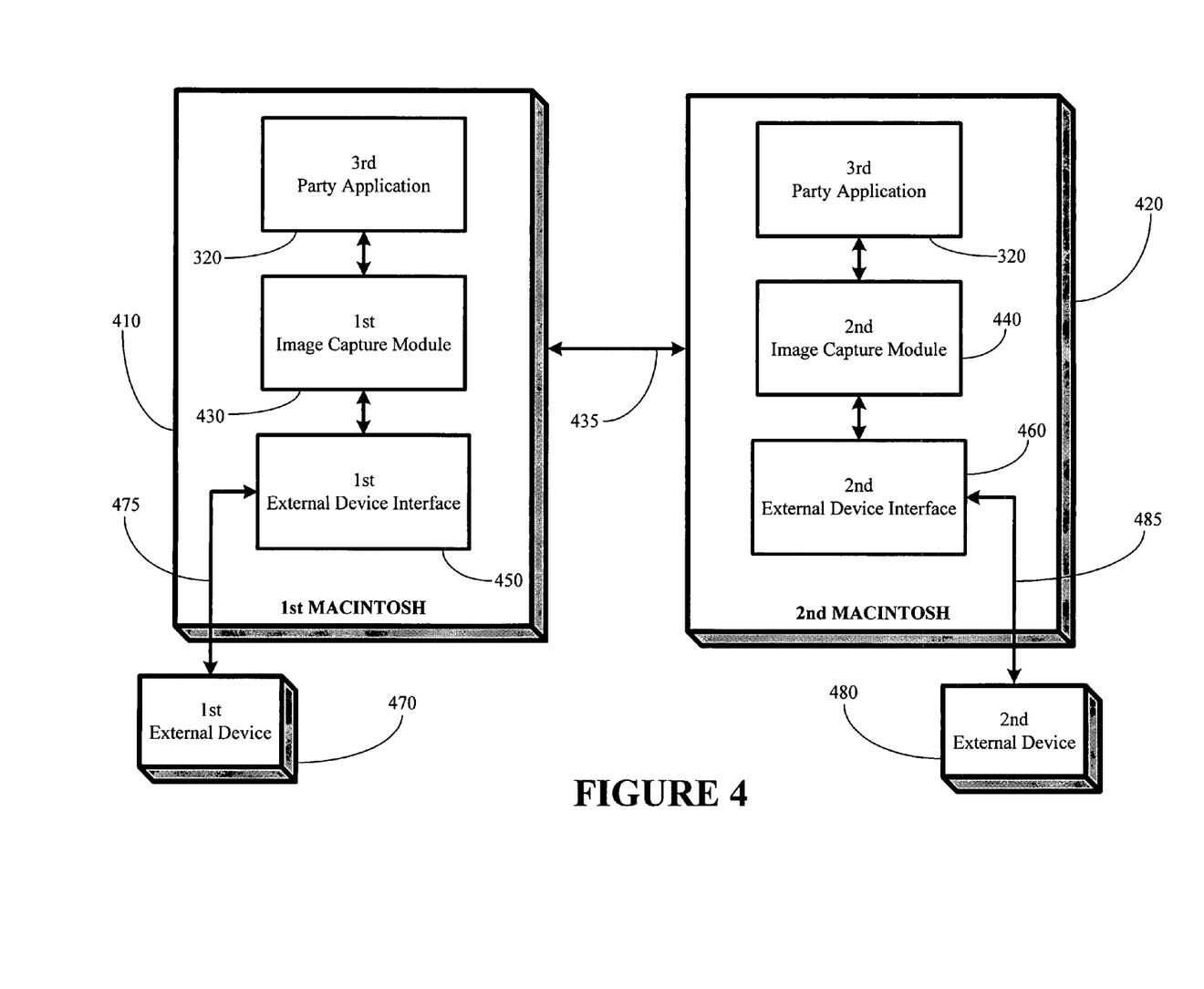
FIG. 4 illustrates a block diagram depiction of a plurality of computer systems interfacing with a plurality of external devices, in accordance with one embodiment of the present invention.

Turning now to FIG. 4, a block diagram depiction of a multi-computer implementation of embodiments of the present invention is illustrated. A first Macintosh 410 may be in communication with a second Macintosh 420 via line 435. Other computer systems may be implemented in the embodiment illustrated in FIG. 4 and remain within the scope and spirit of the present invention. The first Macintosh 410 and the second Macintosh 420 may communicate with one another via a system communications line 435. The system communications line 435 may be a computer bus link, a dedicated hardware communications link, a telephone system communications link, a wireless communications link, or other communication links that may be implemented by those skilled in the art having benefit of the present disclosure.

The first Macintosh 410 comprises a third party application 320, which may include a variety of types of applications that may be used to process and/or control data from the external device(s) 120 described above. The first Macintosh 410 also comprises a first image capture module 430 capable of capturing images from an external device 120. The first Macintosh 410 may be communicatively coupled with a first external device 470, wherein the first external device 470 may include one or more of scanning device 150, remote computer system 112, a cellular or wireless phone 115, a personal communication device (e.g., pager, text messenger, such as one offered by Blackberry®) 135, a personal data assistant (PDA) 140, a memory card reader 116, a camera 118, and/or the like. Similarly, the second Macintosh 420 may be communicatively coupled to a second external device 480, which may include one or more of a scanning device 150, remote computer system 112, a cellular or wireless phone 115, a personal communication device (e.g., pager, text messenger, such as one offered by Blackberry®) 135, a personal data assistant (PDA) 140, a memory card reader 116, a camera 118, and/or the like.

A first external device interface 450 is capable of establishing a communication link with the first external device 470. The first external device interface 450 communicates with the first external device 470 via a communication line 475, which in one embodiment is a system communications line 475. The system communications line 475 may be a computer bus link, a dedicated hardware communications link, a telephone system communications link, a wireless communications link, or other communication links that may be implemented by those skilled in the art having benefit of the present disclosure.

Various data may be accessed by the first Macintosh 410 from the first external device 470. Additionally, the first Macintosh 410 may control the operation of the first external device 470 through one or more control parameters that may be sent to the first external device 470.

Similarly, the second Macintosh 420 comprises at least one third party application 320, which for example may be the iPhoto application described above. The third party application 320 may be in communication with a second image capture module 440. The second image capture module 440 is capable of extracting data from the second external device 480 through the second external device interface 460. The second external device interface 460 provides a communication link to receive and send data status and/or command signals to and from the second Macintosh 420 and the second external device 480. The second external device interface 460 communicates with the second external device 480 via a communication connection represented by a communication line 485. The communication line 485 may be a computer bus link, a dedicated hardware communications link, a telephone system communications link, a wireless communications link, or other communication links that may be implemented by those skilled in the art having benefit of the present disclosure.

The communication link 435 may provide for data communication between the first image capture module 430 and the second image capture module 440. In this way, the first Macintosh 410 may directly communicate with the second external device 480 because of the communication provided by the first and second image capture modules 430, 440. Similarly, the second Macintosh 420 may directly communicate with the first external device 470 due to the connection between the first and second image capture modules 430, 440. The direct communication between the first Macintosh 410 and the second external device 480, as well as the communication between the second Macintosh 420 and the first external device 470, may include data communications with, and/or control of, the external devices 470, 480. For example, the first Macintosh 410 may directly access various images captured by the second external device 480 directly without data being downloaded into the second Macintosh 420. Similarly, the second Macintosh 420 may access images from the first external device 470 directly without affecting the first Macintosh 410. Therefore, the second Macintosh 420 may be located in a remote location, may actually download, and manipulate images directly from the first external device 470.

Additionally, the second Macintosh 420 may also control the operation of the first external device 470. Various control operations may be performed without having to download data from the first external device 470 to the first Macintosh 410 or from the second external device 480 to the second Macintosh 420. Various software modules may be programmed into the first and second image capture modules 430, 440 to enable the third party applications 320 in the Macintosh 410, 420 to control and/or execute various image manipulating features directly from the first or second external devices 470, 480. Therefore, via the communications between the first and second image capture modules 430, 440 remote control, and/or access of images from a variety of image accessing devices (i.e., external devices 120) may be performed. Various blocks of the first and second Macintosh 410, 420, as illustrated in FIG. 4, may be software, hardware, or firmware unit(s) that are standalone units or may be integrated into a computer system associated with the system 200.

Figure 5:
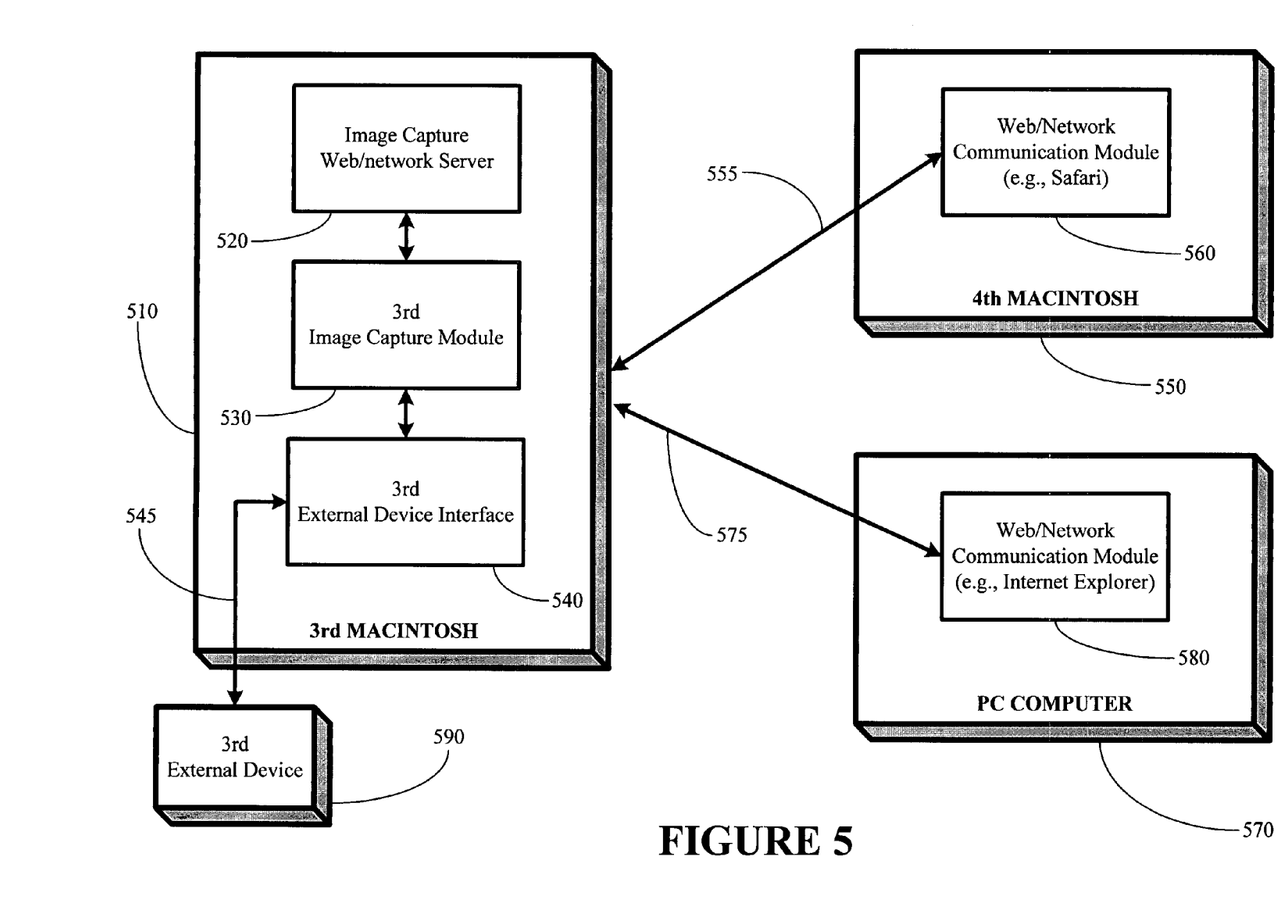
FIG. 5 illustrates a block diagram depiction of a plurality of computer systems interfacing with an external device, in accordance with an alternative embodiment of the present invention.

Turning now to FIG. 5, a second embodiment of a multiple computer system configuration in accordance with embodiments of the present invention is illustrated. FIG. 5 illustrates a third Macintosh 510 in communication with a fourth Macintosh 550 and a Windows® compatible PC Computer System 570. The use of the terms "Macintosh" and "Windows PC" are exemplary and for illustrative purposes and other computers systems may be utilized and remain within the spirit and scope of the present invention. The third Macintosh 510 is in communication with a third external device 590, which may comprise one or more of a scanning device 150, remote computer system 112, a cellular or wireless phone 115, a personal communication device (e.g., pager, text messenger, such as one offered by Blackberry®) 135, a personal data assistant (PDA) 140, a memory card reader 116, a camera 118, and/or the like.

The third Macintosh 510 comprises a third external device interface 540 via a line 545. The line 545 may represent various communication links, such as a computer bus link, a dedicated hardware communications link, a telephone system communications link, a wireless communications link, or other communication links that may be implemented by those skilled in the art having benefit of the present disclosure. The third Macintosh 510 also comprises a third image capture module 530. The third image capture module 530 is capable of extracting data from the third external device 590 via the third external device interface 540.

The third Macintosh 510 also comprises an image capture web/network server 520. The third Macintosh 510 may be in communication with the fourth Macintosh 550 via a line 555, which may comprise a computer bus link, a dedicated hardware communications link, a telephone system communications link, a wireless communications link, or other communication links that may be implemented by those skilled in the art having benefit of the present disclosure. The third Macintosh 510 may also comprise a communication link to the Windows PC via a communication line 575, which may be a computer bus link, a dedicated hardware communications link, a telephone system communications link, a wireless communications link, or other communication links that may be implemented by those skilled in the art having benefit of the present disclosure.

The image capture web/network server 520 provides for a link via a network or a web Internet-type system to other computer systems, such as the fourth Macintosh 550 and the Windows PC computer system 570, to allow for image sharing. For example, the third image capture module 530 is able to control and/or extract data from the third external device 590. The image capture web/network server 520 then provides data communications to the third image capture module 530. In this way, remote computers, such as the fourth Macintosh 550 and the Windows PC 570 may directly control the third external device 590 and extract data. For example, the fourth Macintosh 550 and the Windows PC 570 may view pictures of a digital camera, which may be represented by "third external device 590" block. This may be performed without downloading the pictures into the third Macintosh 510.

The fourth Macintosh 550 may comprise web/network communication module 560, such as the Safari® offered by Apple Computer, Inc. Likewise, the Windows PC computer system 570 may comprise a web/network communication module 580, such as the Internet Explorer® offered by Microsoft Corporation. Using the Safari® or the Internet Explorer®, the fourth Macintosh 550 and/or the PC computer 570 may access data from the third external device 590 and/or control the operation of the third external device 590. This is enabled by the image capture web/network server 520 in conjunction with the third image capture module 530. Therefore, any remote computer that has communication access to the third Macintosh 510 may directly control and/or receive images from the third external device 590. This is generally performed without downloading images of the third external device 590 into the third Macintosh 510.

Additionally, high resolution data may be provided to the fourth Macintosh 550 and the PC computer 570 in this manner. In one exemplary implementation of embodiments of the present invention, a reporter who has a third Macintosh 510 in the field may take pictures using the third external device 590; meanwhile, a home-base operator may extract pictures from the field through a communication link to the third Macintosh 510. Therefore, a person in a home office using the fourth Macintosh 550 or the PC computer 570 may access the content of the third external device 590, which in this example is a camera. The person in the home office may also manipulate the operation of the camera in the field.

Figure 6:
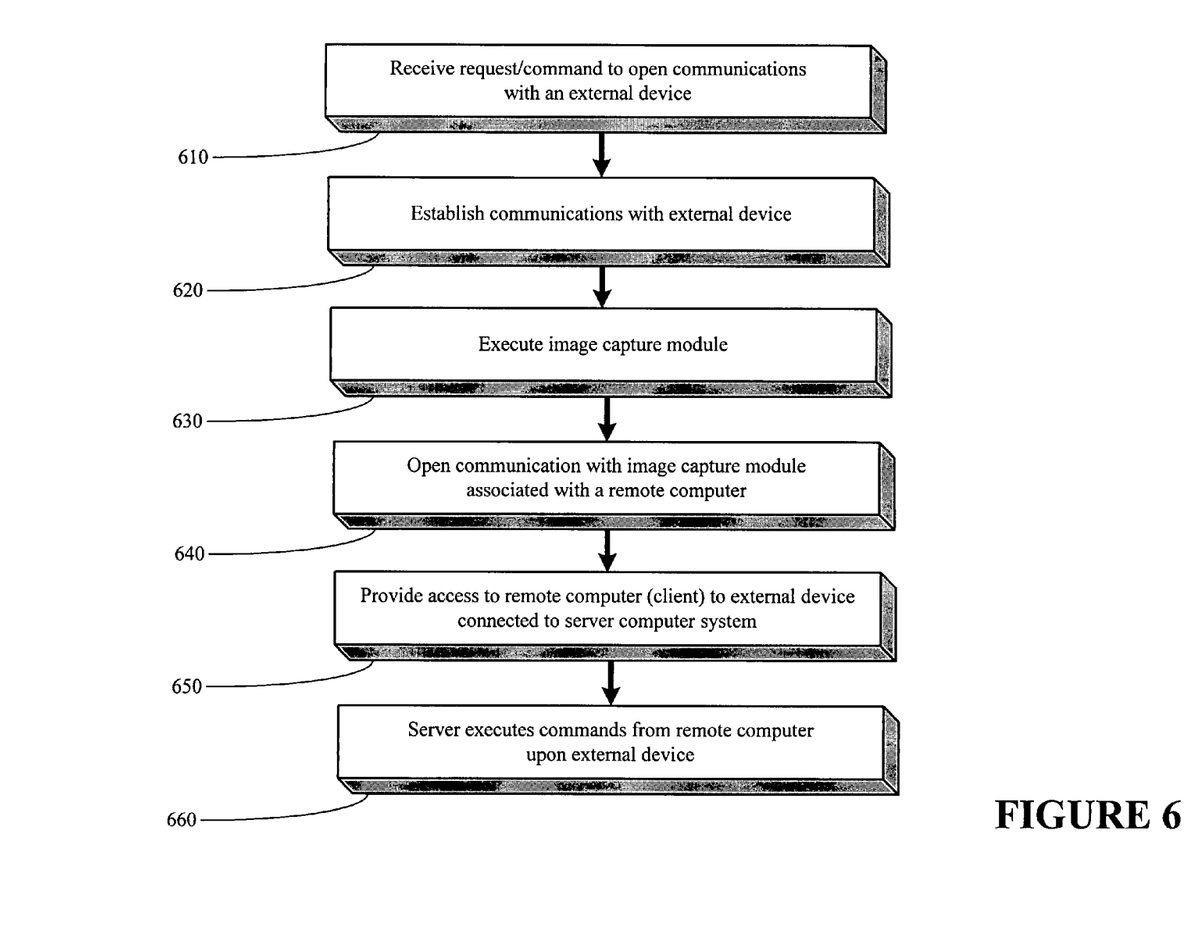
FIG. 6 illustrates a flowchart depiction of a method in accordance with one embodiment of the present invention.

Turning now to FIG. 6, a flow chart depiction of embodiments associated with the present invention is illustrated. The system 200 may receive a request or a command to open communications with an external device (block 610). For example, the server computer system 110 may receive a request to open communications with the external device 120. Based upon the request, the system 200 may establish communications with the external device 120 (block 620). The system 200 may then execute operations of the image capture module 390 to access the external device 120 (block 630). Based upon execution of the image capture module 390, the system 200 communicates the image with the image capture module 390 relating to a remote computer. Therefore, as described in FIG. 4, a remote computer may access the external device 120 coupled to a local computer (block 640).

Upon opening communications with the image capture module of the remote computer, the system 200 then provides access to the external device 120 electronically coupled to the server (block 650). The server then executes commands from the remote computer and/or acquires data for display to the remote computer (block 660). Therefore, the user of the remote computer need not appreciate that control of the external device 120 is actually being performed through a different computer. In other words, the user of the remote computer may access images from the external device 120 (which is connected to another computer) and/or control the operations of the external device 120 without realizing that the external device 120 is not directly connected to the remote computer.

Figure 7:
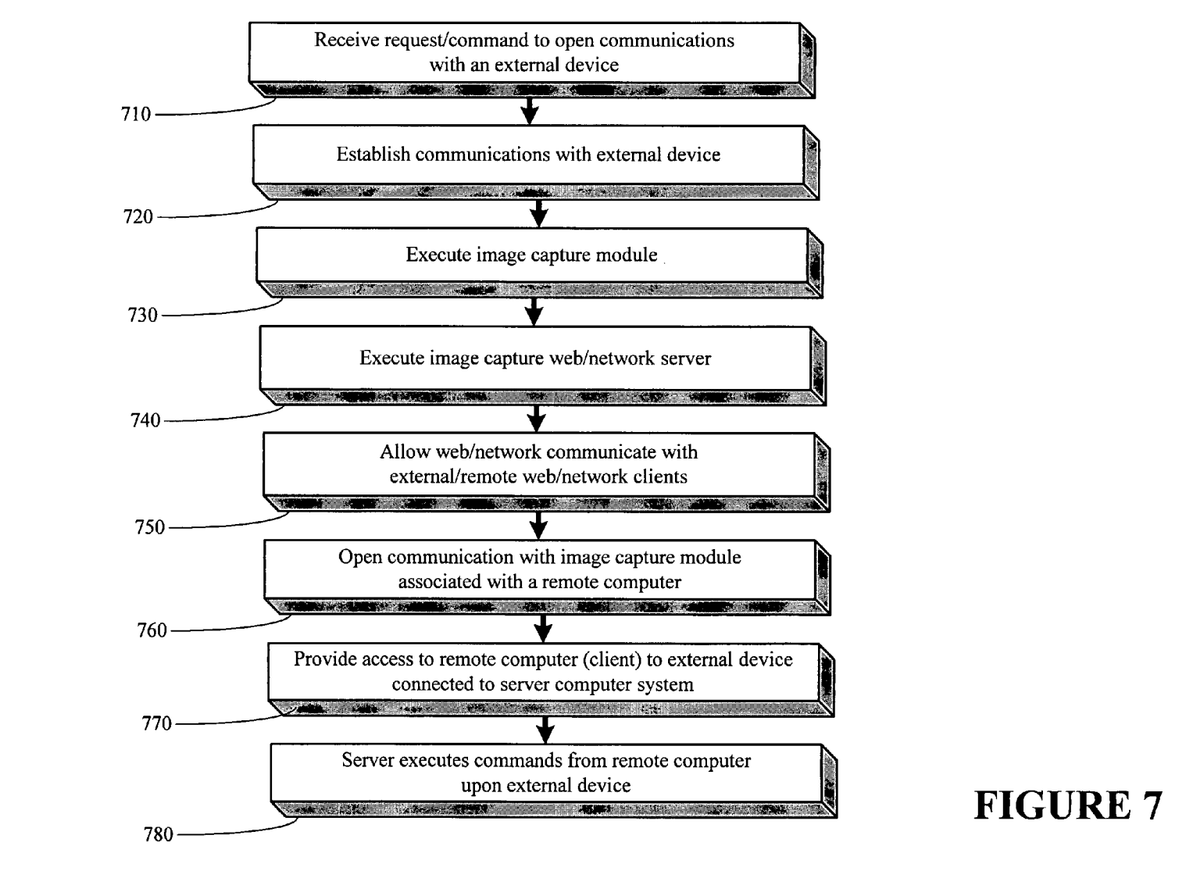
FIG. 7 illustrates a flowchart depiction of a method in accordance with an alternative embodiment of the present invention.

Turning now to FIG. 7, an alternative embodiment of the implementation of the present invention is illustrated. The system 200 may receive a request or a command to open communications with an external device (block 710). For example, the server computer system 110 may receive a request to open communications with the external device 120. Based upon the request, the system 200 may then establish communications with the external device 120 (block 720). The system 200 may then execute the image capture module 390 to access the external device 120 (block 730). The system 200 then executes the image capture web/network server 520 (block 740). The image capture web/network server 520 may provide a link to remote computers.

Upon the execution of the image capture web/network server 520, the system 200 allows for the web/network communication with the external remote web/network clients. Other web-server type software may be used in conjunction with the image capture web/network server 520 (block 750). Based upon this process, the system 200 then provides the image to the image capture module 390 associated with a remote computer. Therefore, as described in FIG. 4, a remote computer may access the external device 120 coupled to a local computer (block 760). Upon opening communications with the image capture module of the remote computer, the system 200 then provides access to the external device connected to the server (block 770). The server computer then executes commands received from the remote computer and/or acquires data for display to the remote computer (block 780). Therefore, the user of the remote computer may not even recognize that control of the external device 120 is actually performed by a different computer. In other words, the user of the remote computer may access images from the external device 120 (which is connected to another computer) and/or control the operations of the external device 120 without realizing that the external device 120 is not directly connected to the remote computer.

Utilizing embodiments of the present invention, a direct control and access to a remote image accessing device may be performed using a remote computer that is in communication with a local computer. Various applications on the remote computer may access data and/or control the operation of the various external devices 120. The data may include any type of data such as audio data, video data, still-image data, and the like. The execution by the remote computer to access the external device on a local computer may be transparent as if the local computer were not there. Without having to download images from the external device into the local computer, users of other remote computers that are in communication with the local computer may browse through images, acquire images, and/or control the operation of the external devices. This provides the opportunity to conduct remote control access and sharing of data.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A non-transitory computer readable medium storing a first image capture module for execution on a first computing device, the first image capture module comprising:

a first set of instructions for interfacing with a plurality of device drivers in order to control a plurality of image capture devices coupled to the first computing device, the plurality of image capture devices comprising at least a camera and an image scanning device;

a second set of instructions for establishing a communication link with a second image capture module of a second computing device, said second image capture module for controlling a third image capture device coupled to the second computing device;

a third set of instructions for allowing the second image capture module of the second computing device to control the camera through the established communication link;

a fourth set of instructions for controlling the third image capture device through the second image capture module;

a fifth set of instructions for interfacing with each of a plurality of client applications executing on the first computing device, said fifth set of instructions allowing each client application to control the plurality of image capture devices through the first image capture module and the device drivers without any client application being required to be directly operable with any of the device drivers.

2. The non-transitory computer readable medium of claim 1, wherein the first computing device is a computer with a first operating system and the second computing device is a computer with a second, different operating system, and said communications link with the second image capture module is through a network.

3. The non-transitory computer readable medium of claim 1, wherein the third set of instructions comprises set of instructions for allowing the second image capture module to retrieve a set of images captured by the camera.

4. The non-transitory computer readable medium of claim 3, wherein said images are high-resolution images.

5. The non-transitory computer readable medium of claim 3, wherein said images are still images.

6. The non-transitory computer readable medium of claim 1, wherein the second computing device can only access the camera through the first computing device.

7. The non-transitory computer readable medium of claim 1, wherein the third set of instructions comprises set of instructions for allowing the second image capture module to command the camera to acquire image data.

8. The non-transitory computer readable medium of claim 1, wherein the second set of instructions is further for establishing a second communication link with a third image capture module of a third computing device and the third set of instructions is further for allowing the third image capture module of the third computing device to control the camera through the second communication link.

9. The non-transitory computer readable medium of claim 1, wherein the first image capture module is part of an operating system for the first computing device.

10. The non-transitory computer readable medium of claim 9, wherein the operating system comprises a set of instructions for building at least a part of each of the plurality of client applications, the client applications for controlling the camera through the first image capture module.

11. The non-transitory computer readable medium of claim 10, wherein the client applications are further for controlling the image scanning device through the first image capture module.

12. The non-transitory computer readable medium of claim 1, wherein the first image capture module further comprises a sixth set of instructions for allowing the second computing device to download a set of images captured by the camera through the established communication link without first downloading the set of images to the first computing device.

13. The non-transitory computer readable medium of claim 12, wherein the second computing device can only access the camera through the first image capture module.

14. The non-transitory computer readable medium of claim 1, wherein said communication link is through at least one of a network connection and an Internet connection.

15. The non-transitory computer readable medium of claim 1, wherein the fifth set of instructions comprises a set of APIs for use by the client applications to control the image capture devices.

16. The non-transitory computer readable medium of claim 1, wherein the first image capture module further comprises a sixth set of instructions for allowing the second computing device to download, from the camera through the established communications link, a set of images captured by the camera, wherein the second computing device only couples to the camera through the first computing device.

17. The non-transitory computer readable medium of claim 16, wherein the camera is coupled directly to the first computing device.

18. The non-transitory computer readable medium of claim 16, wherein the camera is coupled wirelessly to the first computing device.

19. The non-transitory computer readable medium of claim 1, wherein said first image capture module further comprises:

a sixth set of instructions for connecting to a plurality of browsers operating on a plurality of remote computing devices in order for the browsers to send commands to and receive data from the plurality of image capture devices through the device drivers.

20. The non-transitory computer readable medium of claim 19, wherein the sixth set of instructions comprises a set of instructions for connecting to the plurality of browsers through an image capture server module.

21. The non-transitory computer readable medium of claim 19, wherein a first image capture device is connected directly to the first computing device and a second image capture device is connected wirelessly to the first computing device.

22. The non-transitory computer readable medium of claim 19, wherein the first image capture module enables a first browser operating on a first remote computing device to access a first image capture device at the same time that a second browser operating on a second remote computing device accesses a second image capture device.

23. A non-transitory computer readable medium storing an image capture module for execution on a local computing device that communicatively couples to a remote computing device, the image capture module comprising:

a first set of instructions for interfacing with a plurality of device drivers in order to control a plurality of local image capture devices, at least one of which is connected to the local computing device through a wireless connection or a network connection;

a second set of instructions for interfacing with the remote computing device in order to (i) receive commands to control the local image capture device devices from the remote computing device and (ii) send commands to control a remote image capture device that is connected to the remote computing device through a wireless connection or a network connection; and a third set of instructions for interfacing with each of a plurality of client applications executing on the local computing device, said third set of instructions allowing each client application to control the plurality of local image capture devices through the image capture module and the device drivers without any client application being required to be directly operable with any of the device drivers.

24. The non-transitory computer readable medium of claim 23, wherein a second image capture module executes on the remote computing device and sends the commands to control the local image capture device.

25. The non-transitory computer readable medium of claim 23, wherein the remote computing device is a first remote computing device, the second set of instructions further for interfacing with a second remote computing device that communicatively couples to the local computing device, in order to receive commands to control the local image capture device from the second remote computing device.

26. The non-transitory computer readable medium of claim 25, wherein the first and second remote computing devices can only access the local image capture device through the image capture module.

27. The non-transitory computer readable medium of claim 17, wherein said local image capture devices comprise at least one of a scanning device, a cellular or wireless phone, a personal communication device, a personal data assistant, a memory card reader, and a camera.

28. The non-transitory computer readable medium of claim 23, wherein said local computing device is a server computer.

29. The non-transitory computer readable medium of claim 28, wherein said remote computing device is a client computer.

* * * * *

UNITED STATES PATENT AND TRADEMARK OFFICE
CERTIFICATE OF CORRECTION

PATENT NO. : 8,266,241 B1
APPLICATION NO. : 10/873822
DATED : September 11, 2012
INVENTOR(S) : Hans-Werner Neubrand et al.

It is certified that error appears in the above-identified patent and that said Letters Patent is hereby corrected as shown below:

In the Claims:

Claim 3, column 11, line 11, after "comprises" please insert -- a --.

Claim 7, column 11, line 23, after "comprises" please insert -- a --.

Claim 27, column 13, lines 5-6, please delete "claim 17" and substitute -- claim 23 --.

Signed and Sealed this
Nineteenth Day of March, 2013

Teresa Stanek Rea
*Acting Director of the United States Patent and Trademark Office*